United States Patent
Gu et al.

(10) Patent No.: US 9,900,783 B2
(45) Date of Patent: Feb. 20, 2018

(54) ADAPTIVELY POSITION OBJECTS THROUGH MOBILE SIGNAL SOURCES

(71) Applicant: International Business Machines Corporation, Armonk, NY (US)

(72) Inventors: Yu Gu, Cedar Park, TX (US); Inseok Hwang, Austin, TX (US); Su Liu, Austin, TX (US); Yaoguang Wei, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 117 days.

(21) Appl. No.: 14/924,918

(22) Filed: Oct. 28, 2015

(65) Prior Publication Data

US 2017/0086030 A1 Mar. 23, 2017

Related U.S. Application Data

(63) Continuation of application No. 14/860,425, filed on Sep. 21, 2015.

(51) Int. Cl.
*H04W 4/00* (2009.01)
*H04W 24/00* (2009.01)
(Continued)

(52) U.S. Cl.
CPC ........... *H04W 16/18* (2013.01); *G01S 5/0252* (2013.01); *H04W 4/025* (2013.01); *H04W 4/028* (2013.01); *H04W 16/24* (2013.01)

(58) Field of Classification Search
CPC .... H04W 4/02; H04W 64/00; H04L 29/08657
(Continued)

(56) References Cited

U.S. PATENT DOCUMENTS 7,532,113 B2   5/2009   Horvitz et al.
8,284,100 B2   10/2012  Vartanian et al.
(Continued)

FOREIGN PATENT DOCUMENTS

CN   103582119        2/2014
EP   2978258 A1 *    1/2016    ........ H04W 36/0055
(Continued)

OTHER PUBLICATIONS

Cinefra, "An adaptive indoor positioning system based on Bluetooth Low Energy RSS," Polytechnic University of Milan, Milano, Italy, 2012/2013, 147 pages.
(Continued)

*Primary Examiner* — Joshua Schwartz
(74) *Attorney, Agent, or Firm* — VanLeeuwen & VanLeeuwen; Steven L. Bennett

(57) ABSTRACT

An approach is provided that generates a current coverage area by receiving beacon position data of current beacon locations, with at least some of the beacons being moveable beacons. Object position data is retrieved for current locations and trajectories of moveable objects in a geographic area that are currently being tracked by the beacons. An anticipated coverage area is computed based on comparing the object position data with the current coverage area. Instructions are then wirelessly transmitted to some of the moveable beacons in order to move the beacons to a different set of locations based on the anticipated coverage area.

5 Claims, 7 Drawing Sheets

(51) Int. Cl.
   *H04W 16/18* (2009.01)
   *H04W 4/02* (2018.01)
   *H04W 16/24* (2009.01)
   *G01S 5/02* (2010.01)

(58) Field of Classification Search
   USPC .......................................... 455/456.1–456.6
   See application file for complete search history.

(56) References Cited

U.S. PATENT DOCUMENTS

| | | | |
|---|---|---|---|
| 8,583,400 B2 | 11/2012 | Thrun et al. | |
| 8,639,640 B1 | 1/2014 | Kadous | |
| 8,862,400 B2 | 10/2014 | Kelly | |
| 2004/0203911 A1* | 10/2004 | Masuda | H04B 7/2606 455/456.1 |
| 2014/0057626 A1* | 2/2014 | Uelk | H04W 24/00 455/423 |
| 2014/0277854 A1 | 9/2014 | Jones et al. | |
| 2015/0003265 A1 | 1/2015 | Mansour | |
| 2015/0039226 A1 | 2/2015 | Ghose et al. | |
| 2016/0073271 A1* | 3/2016 | Schultz | H04L 63/105 455/404.1 |

FOREIGN PATENT DOCUMENTS

| | | | | |
|---|---|---|---|---|
| GB | 2532966 A | * | 6/2016 | ......... H04B 7/18504 |
| JP | 5605539 | | 10/2014 | |

OTHER PUBLICATIONS

Yang et al., "FreeLoc: Calibration-free crowdsourced indoor localization," The 32nd IEEE International Conference on Computer Communications, Apr. 2013, Turin, Italy, pp. 2481-2489.

Rai et al., "Zee: Zero-Effort Crowdsourcing for Indoor Localization," Proceedings of the 18th annual international conference on Mobile computing and networking, Aug. 2012, Istanbul, Turkey, pp. 293-304.

Gu et al., "Adaptively Position Objects Through Mobile Signal Sources," U.S. Appl. No. 14/860,425, filed Sep. 21, 2015, 37 pages.

"List of IBM Patents or Patent Applications Treated as Related," Letter from Leslie A. Van Leeuwen, Oct. 28, 2015, 1 page.

* cited by examiner

ADAPTIVELY POSITION OBJECTS THROUGH MOBILE SIGNAL SOURCES

BACKGROUND

Technical Field

This disclosure relates to mobile signal sources and, more particularly, relates to adaptively positioning mobile signal sources based on needed coverage for an area.

Description of Related Art

The current positioning technologies focus on a stationary infrastructure of signal sources. These signal sources include fixed access points, beacons and the like. Due to the dynamic nature of environments, such a stationary infrastructure is difficult to provide consistent performance over time or at different locations. For many applications such as a disaster response/rescue application, it is imperative to keep and maintain high precision positioning of first responders and victims.

SUMMARY

An approach is provided that generates a current coverage area by receiving beacon position data of current beacon locations, with at least some of the beacons being moveable beacons. Object position data is retrieved for current locations and trajectories of moveable objects in a geographic area that are currently being tracked by the beacons. An anticipated coverage area is computed based on comparing the object position data with the current coverage area. Instructions are then wirelessly transmitted to some of the moveable beacons in order to move the beacons to a different set of locations based on the anticipated coverage area.

The foregoing is a summary and thus contains, by necessity, simplifications, generalizations, and omissions of detail; consequently, those skilled in the art will appreciate that the summary is illustrative only and is not intended to be in any way limiting. Other aspects, features, and advantages of the present disclosure will be apparent in the non-limiting detailed description set forth below.

BRIEF DESCRIPTION OF THE DRAWINGS

Embodiments of the present invention may be better understood, and its numerous objects, features, and advantages made apparent to those skilled in the art by referencing the accompanying drawings, wherein.

DETAILED DESCRIPTION

Figure 1:
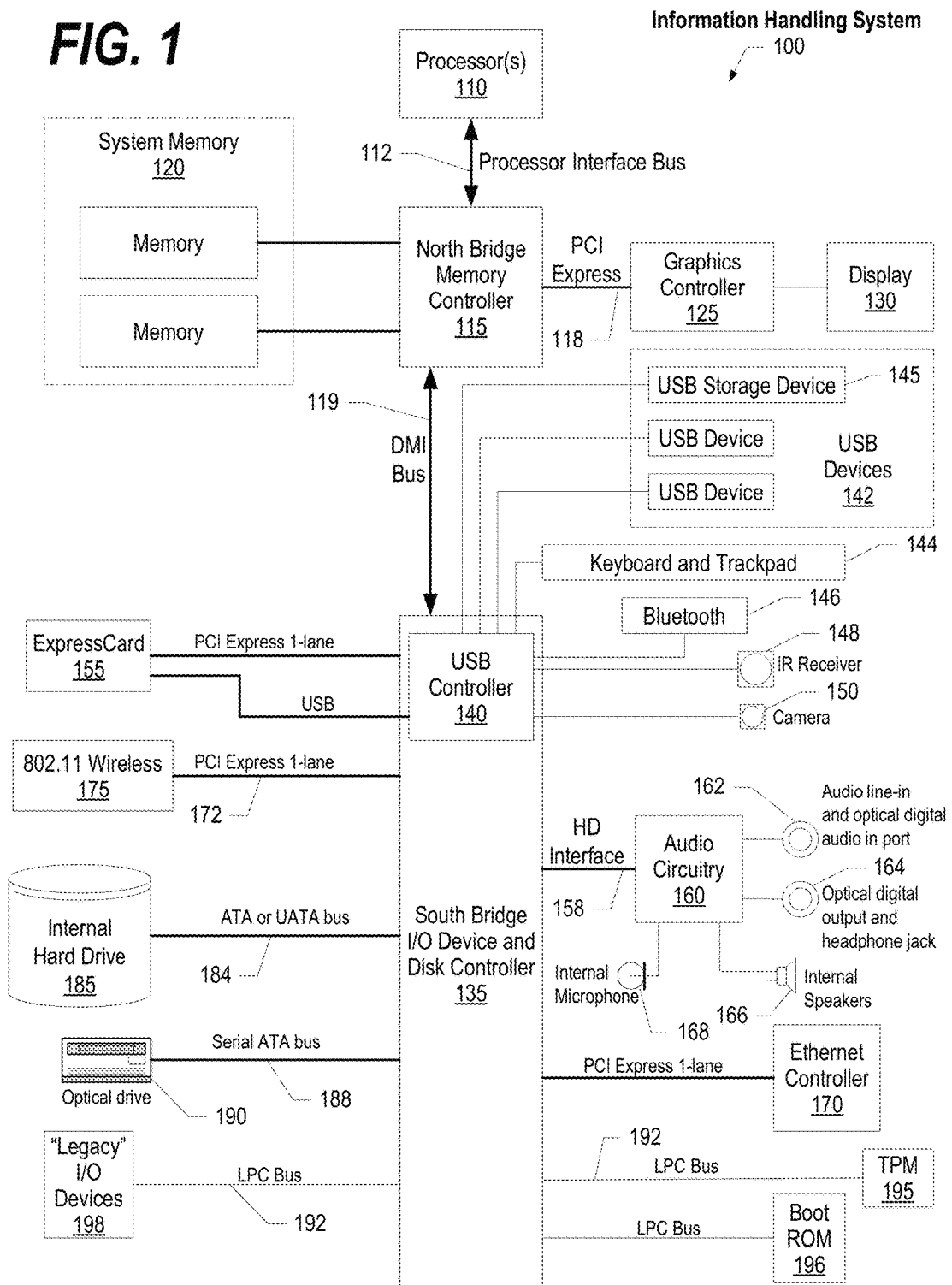
FIG. 1 depicts a block diagram of a processor and components of an information handling system.

FIGS. 1-7 show an approach for adaptively position objects through mobile signal sources. By adaptively changing the positioning infrastructure, such as mobile signal sources (beacons, etc.) carried by robots or drones, the approach creates optimal signal response patterns that help in accurately and robustly positioning objects. To effectively relocate mobile signal sources, the system predicts the potential future positions of objects based on their current locations and current trajectories. The new locations of mobile signal sources are then computed to provide the best coverage in terms of accuracy and robustness within the region of potential future positions. In one embodiment, a global controller is deployed to coordinate the locations of different mobile signal sources. The major components on the global controller side are: the Mobile Signal Sources Data Receiver, the Object Current Position Estimation, the Object Future Positions Prediction, and the Mobile Signal Sources Position Planner.

The Mobile Signal Sources Data Receiver is an enhanced module that continuously listens to the transmissions from local controllers, and performing functionalities such as data aggregation, data cleaning, data validation and etc. The Object Current Position Estimation is an enhanced module that estimates the object position based on the data feed from mobile signal sources data receiver module. The position estimation can be based on a wide range of existing techniques such as wireless ranging, fingerprinting and so on. The module output feeds to other location based services for different application scenarios. The Object Future Positions Prediction is an enhanced module that predicts the potential positions of the object in the near future. The prediction can be based on the building layout, previous trajectories and so on. The output of this module is a constrained region centered around the current position of the object. The Mobile Signal Sources Position Planner is an enhanced module that plans and decides the new locations for individual mobile signal sources, such that the accuracy and robustness of object current position estimation module can be improved or maintained.

The major components on the local controller side are the Object Signal Response Collector, the Object Response Reporter and the Motion Controller.

The Object Signal Response Collector is an enhanced module that continuously listens to the responses of object from the signals generated by the local source. The module also performs functionalities such as data aggregation, data cleaning, data validation and etc. The Object Response Reporter is an enhanced module that reports the responses of the object for the local signal sources to the global controller. The module ensures the real-time, reliable and secure communications between the local controller and global controller. The Motion Controller is an enhanced module that controllers the movement of the mobile signal source based on the instructions from mobile signal sources position planner at global controller. The motion controller ensures that the mobile signal source moves in optimal trajectory and avoid collisions with other mobile signal sources.

Embodiments of the present invention may be a system, a method, and/or a computer program product. The computer program product may include a computer readable storage medium (or media) having computer readable program instructions thereon for causing a processor to carry out aspects of embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

Aspects of embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 2:
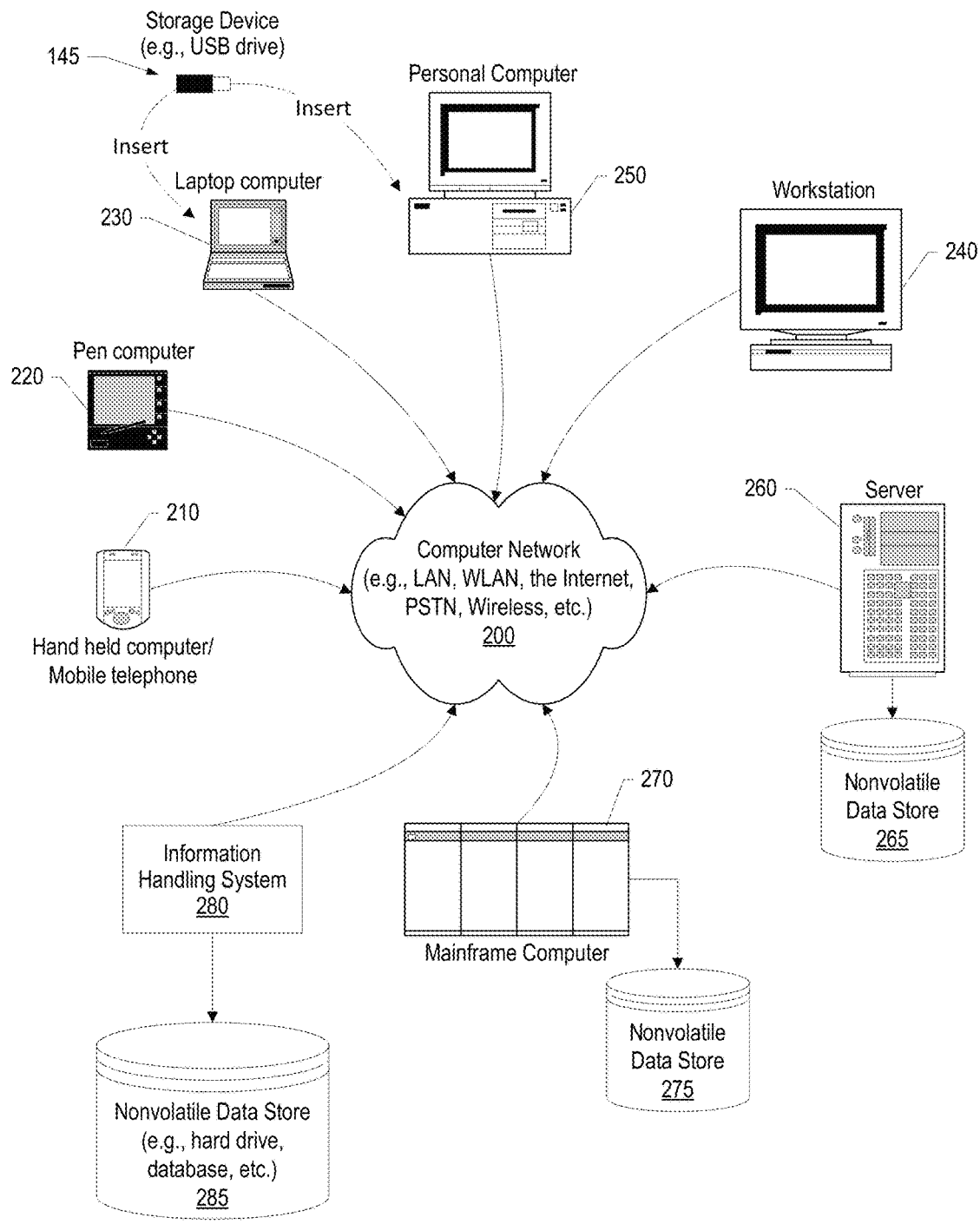
FIG. 2 is a network environment that includes various types of information handling systems interconnected via a computer network.

FIG. 1 illustrates information handling system 100, which is a simplified example of a computer system capable of performing the computing operations described herein.

Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 0.802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
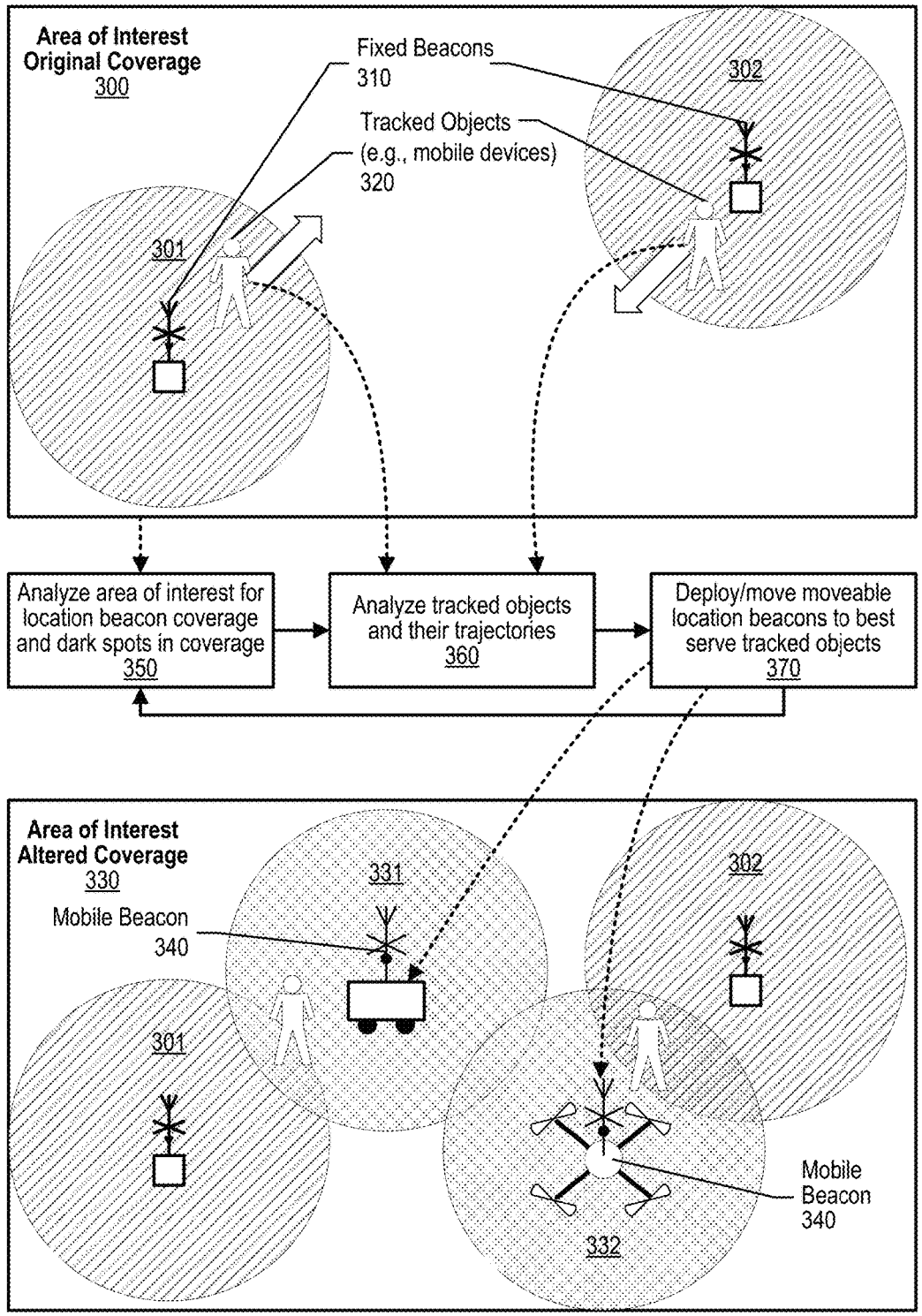
FIG. 3 is a diagram depicting mobile beacons being dynamically positioned to provide better coverage when objects that are being tracked move from one location to another.

FIG. 3 is a diagram depicting mobile beacons being dynamically positioned to provide better coverage when objects that are being tracked move from one location to another. Geographic area 300 includes objects 320 that are being tracked using a number of beacons, such as fixed beacons 310 and any mobile beacons that have been deployed to the geographic area. A current coverage area is generated for geographic area 300. The current coverage area is depicted as areas 301 and 302 proximate to the two fixed beacons shown deployed in the area.

At step 350, the process receives data pertaining to the area being monitored and analyzes location beacon data for current coverage of the area and any weak or dark spots in the coverage area. In addition, the process receives object position data with current location data and trajectory data pertaining to moveable objects 320 that are being tracked. For example, the moveable objects might be portable electronic devices worn or carried by first responders to an emergency or disaster situation. At step 360, the process analyzes the tracked objects and their current trajectories. In the example shown, both of the tracked objects have a current trajectory that is anticipated to take the object outside of the coverage area so that the object will have weak coverage by beacons 310 once they arrive at their anticipated new locations.

The approach computes an anticipated coverage area that takes into account the current location of the objects that are being tracked as well as their current trajectories. At step 370, the process wirelessly transmits instructions to moveable beacons 340 to move the mobile beacons to a set of new locations based on the anticipated coverage area. The resulting altered coverage map of the geographic area is shown in map 330 that depicts the addition of two additional mobile beacons and additional coverage areas 331 and 332 created as result of deploying the mobile beacons to the new locations. After deployment of the mobile beacons, the mobile beacons can be repeatedly moved to different locations in response to movement and anticipated movement of the moveable objects.

Figure 4:
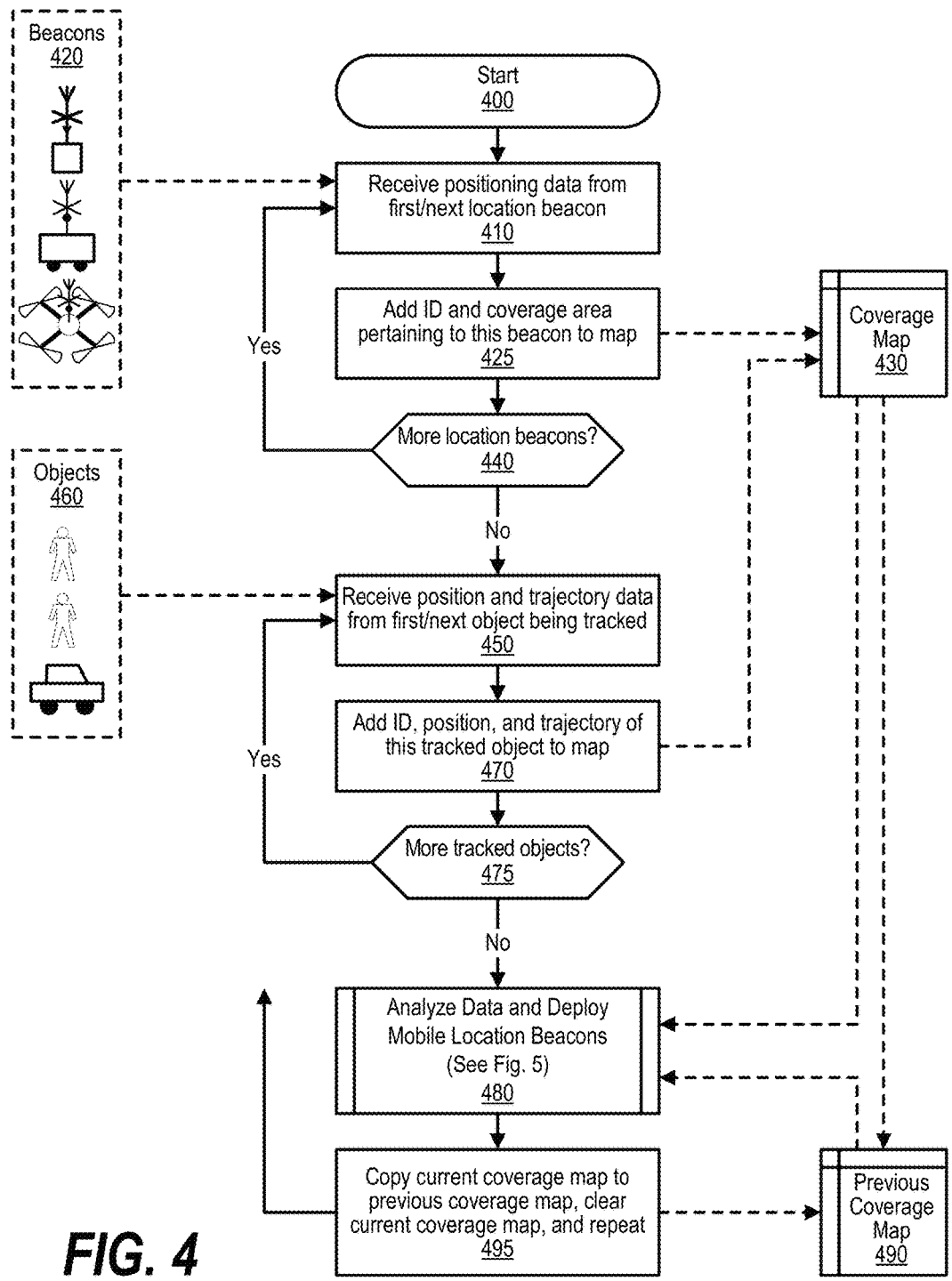
FIG. 4 is a flowchart showing steps that adaptively position objects through mobile signal sources.

FIG. 4 is a flowchart showing steps that adaptively position objects through mobile signal sources. FIG. 4 processing commences at 400 and shows the steps taken by the process that controls the position of mobile beacons in an area that is being monitored. At step 410, the process receives positioning data from the first location beacon currently deployed in the area (beacons 420). At step 425, the process adds the identifier and the coverage area pertaining to this beacon to the current coverage map that is stored in memory area 430. The coverage area might be received from the beacon and might be derived based on the characteristics of the beacon (e.g., signal strength, model information, etc.) along with the topographic characteristics proximate to the beacon (e.g., elevation of beacon, nearby hills, valleys, obstructions, etc.). The process determines as to whether there more location beacons currently deployed in the geographic area that is being monitored (decision 440). If there more location beacons currently deployed, then decision 440 branches to the 'yes' branch which loops back to step 410 to process data from the next beacon. This looping continues until there are no further beacons to process, at which point decision 440 branches to the 'no' branch exiting the loop.

At step 450, the process receives current position and trajectory data from the first object being tracked (moveable objects 460). At step 470, the process adds the object identifier, the object's current position, and the object's current trajectory to the current coverage map that is stored in memory area 430. The process determines as to whether there are more objects in the area that are being tracked (decision 475). If there are more objects in the area that are being tracked, then decision 475 branches to the 'yes' branch which loops back to step 450 to process the next object as described above. This looping continues until there are no more objects to process, at which point decision 475 branches to the 'no' branch exiting the loop.

Figure 5:
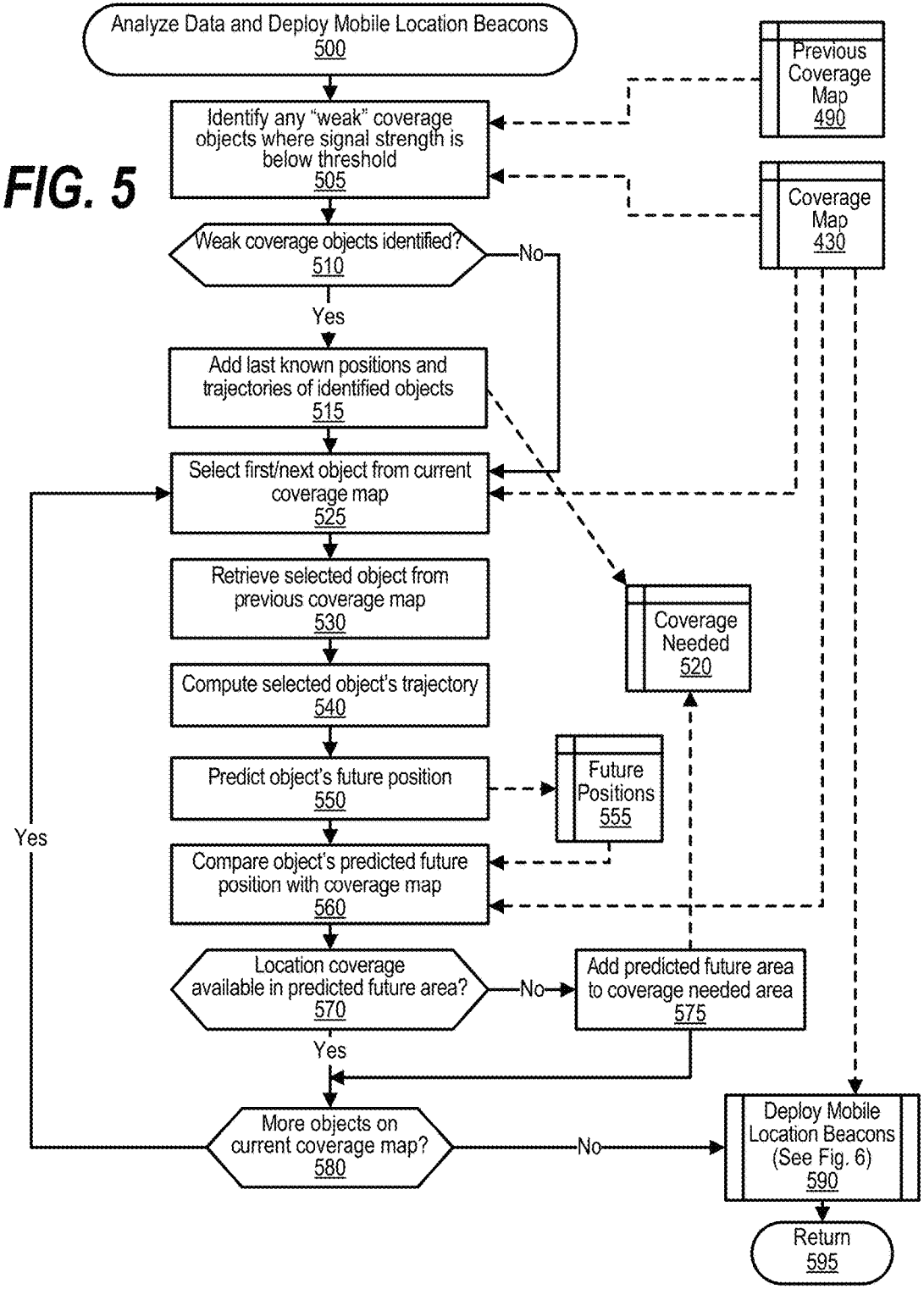
FIG. 5 is a flowchart showing steps that analyze data from tracked objects and deploy mobile location beacons accordingly.

At predefined process 480, the process performs the Analyze Data and Deploy Mobile Location Beacons routine (see FIG. 5 and corresponding text for processing details). This routine processes data from the current coverage map (memory area 430) and any previously created (prior) coverage maps (memory area 490) After the data has been analyzed and the mobile beacons have been deployed then, at step 495, the process copies the current coverage map from memory area 430 to previous coverage map in memory area 490, and clears the contents from the current coverage map (memory area 430). The process then repeats by looping back to step 410.

FIG. 5 is a flowchart showing steps that analyze data from tracked objects and deploy mobile location beacons accordingly. FIG. 5 processing commences at 500 and shows the steps taken by a process that analyzes beacon and object data and deploys mobile location beacons to new locations. At step 505, the process identifies any "weak" coverage objects where signal strength is below a given threshold. For example, a first responder may have traveled to an area away from any beacon and have a very weak signal making it difficult to track the first responder or provide assistance to the first responder's location if the responder experiences trouble. Step 505 identifies weak coverage objects by retrieving data from previous coverage map from memory area 490 as well as current coverage map from memory area 430. The threshold may be a current signal strength level, a degradation in signal strength from the previous coverage map to the current coverage map, or any combination thereof.

The process determines as to whether any weak coverage objects were identified (decision 510). If any weak coverage objects were identified, then decision 510 branches to the 'yes' branch whereupon at step 515 the process adds last known positions and trajectories of identified objects to a coverage needed repository that is stored in memory area 520. On the other hand, if no weak coverage objects were identified, then decision 510 branches to the 'no' branch bypassing step 515.

At step 525, the process selects the first object from current coverage map (memory area 430). At step 530, the process retrieves the selected object from previous coverage map (memory area 490). At step 540, the process computes the trajectory of the selected object. At step 550, the process predicts the object's future position based on the object's current position and computed trajectory. The predicted future position of the object is stored in memory area 555. At step 560, the process compares the object's predicted future position with the current coverage map from memory area 430.

The process determines as to whether location coverage is currently available in the object's predicted future area (decision 570). If location coverage is currently available in the object's predicted future area, then decision 570 branches to the 'yes' branch bypassing step 575. On the other hand, if location coverage is not currently available in the object's predicted future area, then decision 570 branches to the 'no' branch whereupon, at step 575, the process adds the object's predicted future position to the coverage needed repository in memory area 520.

The process then determines as to whether there are more objects to process on the current coverage map (decision 580). If there are more objects to process on the current coverage map, then decision 580 branches to the 'yes' branch which loops back to step 525 to select and process the next object as described above. This looping continues until there are no more objects to process, at which point decision 580 branches to the 'no' branch exiting the loop. At predefined process 590, the process performs the Deploy Mobile Location Beacons routine (see FIG. 6 and corresponding text for processing details). FIG. 5 processing thereafter returns to the calling routine (see FIG. 4) at 595.

Figure 6:
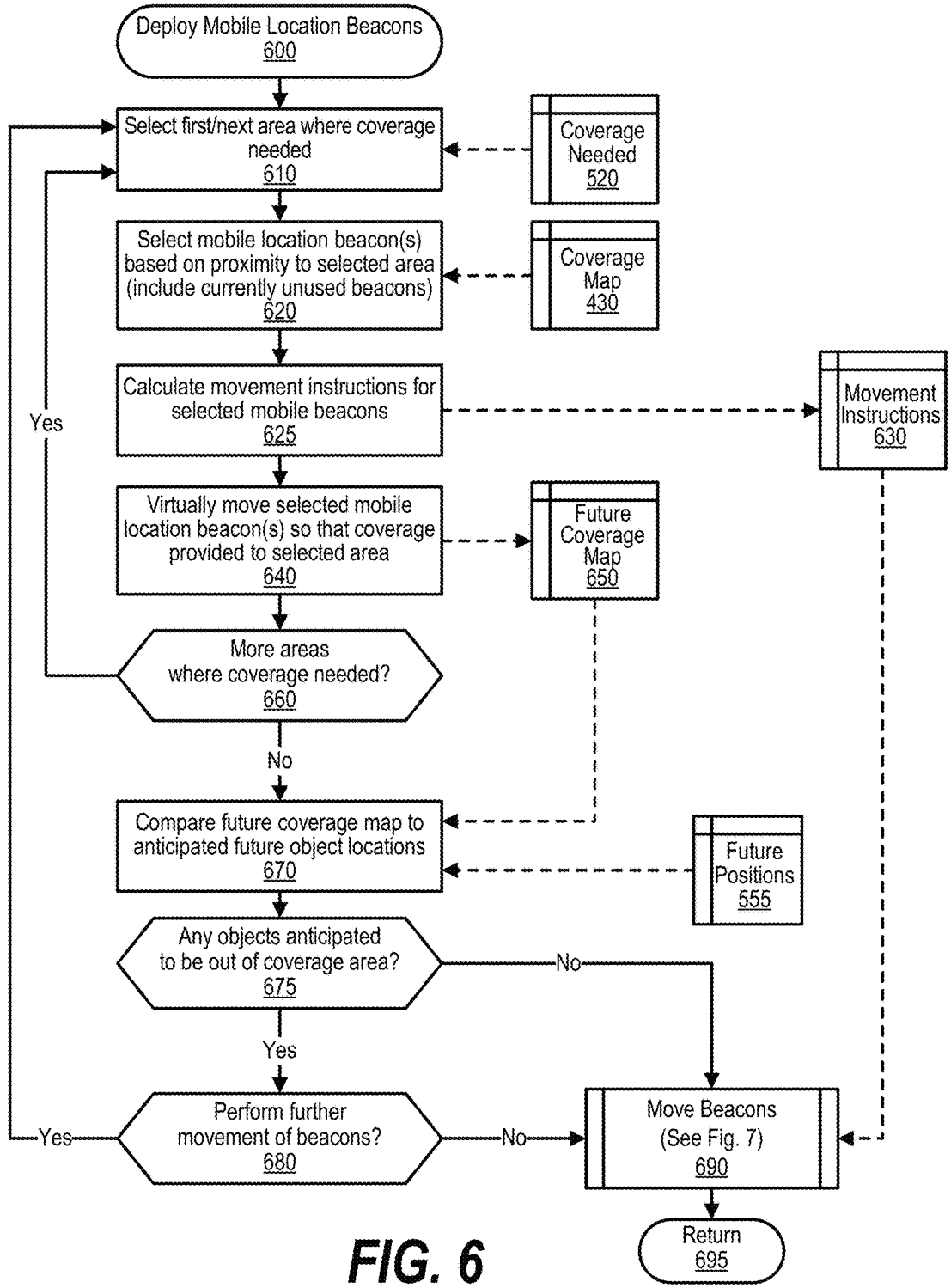
FIG. 6 is a flowchart showing steps that deploy the mobile location beacons.

FIG. 6 is a flowchart showing steps that deploy the mobile location beacons. FIG. 6 processing commences at 600 and shows the steps taken by a process that deploys the mobile location beacons. At step 610, the process selects the first area where coverage is needed from memory area 520. At step 620, the process selects one or more mobile location beacons based on the beacons proximity to the selected area that needs coverage. Mobile beacons that are selected can include currently non-deployed beacons, such as those brought to the scene of a natural disaster area by first responders and their support staff. In addition, the beacons that are selected can include beacons that are in locations where they are not anticipated to be used by any of the objects that are being tracked.

Step 620 retrieves the current coverage map from memory area 430. At step 625, the process calculates the movement instructions that could be sent to selected mobile beacons in order to provide coverage to the selected area where coverage is needed. The movement instructions are stored in memory area 630. At step 640, the process virtually moves the selected mobile location beacons so that coverage would provided to selected area. Virtually moving the beacons allows the process to simulate the coverage after all areas have been processed so that the positions of the beacons can be repeatedly altered in a virtual environment before wirelessly transmitting the movement instructions to the moveable beacons. The anticipated future coverage map is stored in memory area 650.

The process determines as to whether there are more areas included in memory area 520 where coverage is needed (decision 660). If there are more areas where coverage is needed, then decision 660 branches to the 'yes' branch which loops back to step 610 to select and process the next area where coverage is needed. This looping continues until all of the areas where coverage is needed have been processed, at which point decision 660 branches to the 'no' branch exiting the loop. At step 670, the process compares the anticipated future coverage map retrieved from memory area 650 to the anticipated future object locations retrieved from memory area 555. The process determines as to whether there are any objects that are anticipated to be out of coverage area or in a weak coverage area (decision 675). If there are any objects that are anticipated to be out of coverage area or in a weak coverage area, then decision 675 branches to the 'yes' branch to perform decision 680. On the other hand, if there are not any objects that are anticipated to be out of coverage area or in a weak coverage area, then decision 675 branches to the 'no' branch bypassing decision 680.

At decision 680, the process determines whether to perform further virtual movement of the beacons to better cover objects anticipated to be outside the predicted future coverage area. If performing further virtual movement of the beacons would be beneficial, then decision 680 branches to the 'yes' branch which loops back to step 610 to reselect the coverage areas and reposition the moveable beacons. This looping continues until further movement of the beacons is not deemed beneficial, at which point decision 680 branches to the 'no' branch exiting the loop.

Figure 7:
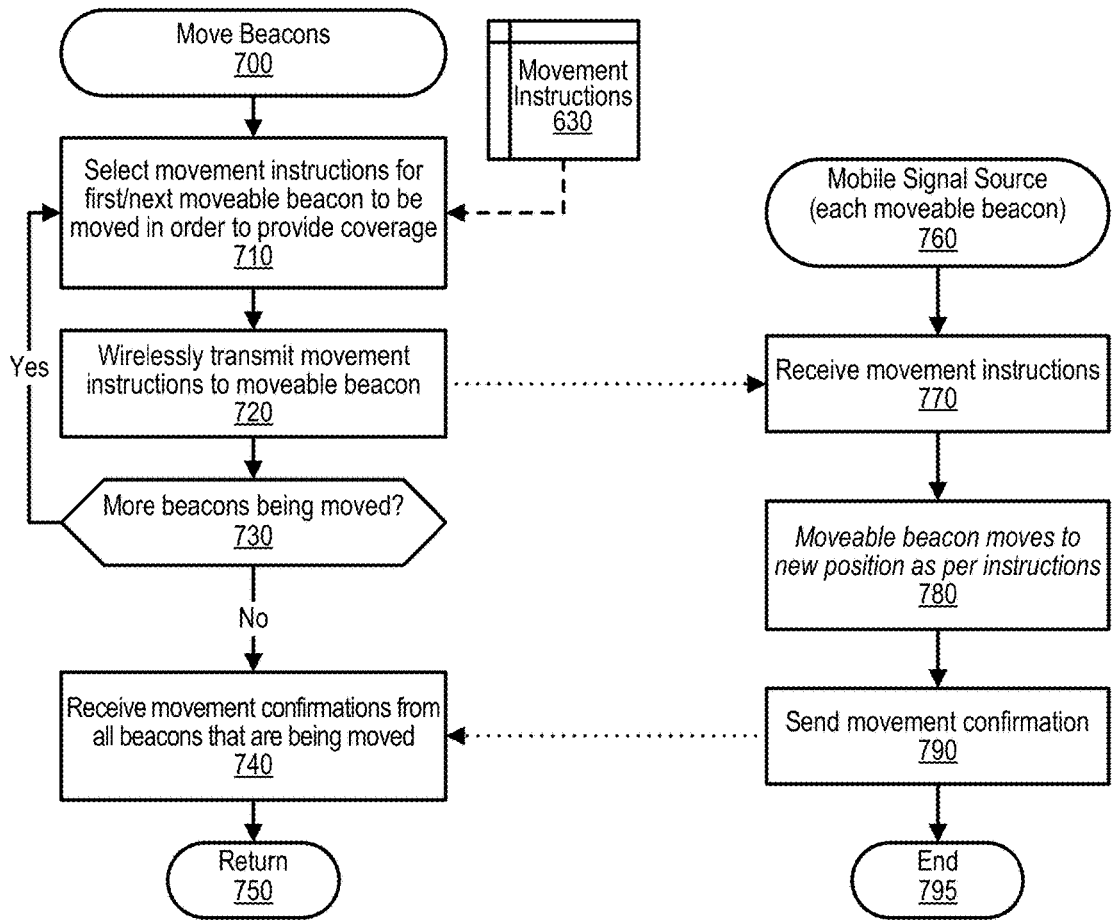
FIG. 7 is a flowchart showing steps that move beacons to locations as instructed by the processing performed in FIG. 6.

At predefined process 690, the process performs the Move Beacons routine (see FIG. 7 and corresponding text for processing details). FIG. 6 processing thereafter returns to the calling routine (see FIG. 5) at 695.

FIG. 7 is a flowchart showing steps that move beacons to locations as instructed by the processing performed in FIG. 6. FIG. 7 processing commences at 700 and shows the steps taken by the process that moves the moveable beacons to new locations. At step 710, the process selects movement instructions for the first moveable beacon to be moved in order to provide improved coverage. Step 710 retrieves the movement instructions from memory area 630. At step 720, the process wirelessly transmits the retrieved movement instructions to the selected moveable beacon.

The process determines as to whether there are more moveable beacons that are being moved at this time (decision 730). If there are more moveable beacons that are being moved, then decision 730 branches to the 'yes' branch which loops back to step 710 to select process the next moveable beacon as described above. This looping continues until there are no more moveable beacons that are being moved, at which point decision 730 branches to the 'no' branch exiting the loop. After sending the movement instructions to the moveable beacons, the process waits for movement confirmations to be received at step 740 from all of the beacons that are being moved. The process that sends the instructions to moveable beacons returns to the calling routine (see FIG. 6) at 750.

The repositioning process that is performed by each of the mobile beacons is shown commencing at 760. At step 770, the mobile beacon wirelessly receives the movement instructions. At step 780, the moveable beacon moves to a new position as per the received instructions. Once the beacon has been moved to the new position, at step 790, the mobile beacon sends a movement confirmation indicating that the mobile beacon is at the new location. The repositioning processing performed at the mobile beacon thereafter ends at 795.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method executed by an information handling system comprising one or more processors and a memory, the method comprising:
   computing a current coverage area based on beacon position data of current locations corresponding to a plurality of beacons, wherein one or more of the plurality of beacons are moveable beacons;
   retrieving object position data comprising current locations and trajectories corresponding to a plurality of moveable objects in a geographic area that are currently being tracked by the beacons;
   computing a set of anticipated future object positions of the plurality of movable objects based on the object position data;
   generating a first set of relocation instructions to form a first anticipated coverage area of the plurality of beacons based on comparing the set of anticipated future object positions with the current coverage area;
   determining that one or more of the set of anticipated future object positions are outside the first anticipated coverage area;
   in response to the determining that one or more of the set of anticipated future object positions are outside the first anticipated coverage area, generating a second set of relocation instructions in lieu of transmitting the first set of relocation instructions to one or more of the movable beacons, wherein the second set of relocation instructions forms a second anticipated coverage area of the plurality of beacons; and
   in response to determining that each of the set of anticipated future object positions are within the second anticipated coverage area, wirelessly transmitting the second set of relocation instructions to at least one of the moveable beacons to move to one or more new locations.

2. The method of claim 1 further comprising:
   deploying one or more additional mobile beacons to one or more of the new locations based on the second anticipated coverage area, wherein the additional mobile beacons are selected from a group consisting of airborne drone based mobile beacons and ground based robotic mobile beacons.

3. The method of claim 1 further comprising:
   generating a coverage map of the current coverage area based on the current locations of the plurality of beacons;
   comparing the generated coverage map to a previously generated coverage map, wherein the comparison identifies one or more weak coverage areas; and
   adding the weak coverage areas to the first anticipated coverage area.

4. The method of claim 1 further comprising:
   comparing the retrieved object position data of the current locations with a previously retrieved set of object position data;
   identifying one or more weak coverage objects where a signal strength of the weak coverage objects are below a threshold;
   calculating a set of weak coverage positions corresponding to the one or more weak coverage objects; and
   adding the one or more weak coverage positions to the first anticipated coverage area.

5. The method of claim 1 further comprising:
   repeatedly receiving updated current coverage areas by receiving updated beacon position data of locations corresponding to the plurality of beacons after movement of the one or more moveable beacons;
   repeatedly retrieving updated object position data of updated current locations and updated trajectories corresponding to the plurality of moveable objects;
   repeatedly computing the second anticipated coverage area based on comparing the updated object position data with the current coverage area; and
   repeatedly transmitting instructions to at least one of the moveable beacons to move to an updated set of new locations based on the second anticipated coverage area.

* * * * *